(12) United States Patent
Pnueli et al.

(10) Patent No.: US 9,063,884 B2
(45) Date of Patent: Jun. 23, 2015

(54) ANALYSIS OF HEALTH INDICATORS OF A SYSTEM

(71) Applicant: Hewlett-Packard Development Company, L.P., Houston, TX (US)

(72) Inventors: Ayelet Pnueli, Haifa (IL); Ami Shiff, Haifa (IL); Avner Arnstein, Nes Ziona (IL); Ron Maurer, Haifa (IL); Tsafrir Yedid Am, Nes Ziona (IL); Lior Katz, Nes Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 13/658,078

(22) Filed: Oct. 23, 2012

(65) Prior Publication Data

US 2014/0115398 A1    Apr. 24, 2014

(51) Int. Cl.
*G06F 11/00* (2006.01)
*G06F 11/14* (2006.01)
*G06F 11/07* (2006.01)
*G06F 11/30* (2006.01)
*G05B 19/042* (2006.01)

(52) U.S. Cl.
CPC ............ *G06F 11/14* (2013.01); *G06F 11/0706* (2013.01); *G06F 11/079* (2013.01); *G06F 11/30* (2013.01); *G05B 19/0428* (2013.01)

(58) Field of Classification Search
USPC ......................................................... 714/47.3
See application file for complete search history.

(56) References Cited

U.S. PATENT DOCUMENTS

| | | | |
|---|---|---|---|
| 5,737,520 A * | 4/1998 | Gronlund et al. ............... | 714/39 |
| 5,768,498 A * | 6/1998 | Boigelot et al. ................ | 714/39 |
| 6,279,127 B1 * | 8/2001 | Moore ......................... | 714/47.3 |
| 6,591,272 B1 * | 7/2003 | Williams ............................ | 1/1 |
| 6,751,788 B1 * | 6/2004 | Goser .......................... | 717/127 |
| 2002/0066080 A1 * | 5/2002 | O'Dowd ...................... | 717/128 |
| 2003/0120980 A1 * | 6/2003 | Harris ............................. | 714/45 |
| 2003/0140282 A1 * | 7/2003 | Kaler et al. .................... | 714/39 |
| 2007/0055914 A1 * | 3/2007 | Chandwani et al. ........... | 714/47 |
| 2007/0233858 A1 * | 10/2007 | Goff et al. .................... | 709/224 |

* cited by examiner

*Primary Examiner* — Kamini Patel
(74) *Attorney, Agent, or Firm* — Turocy & Watson, LLP

(57) ABSTRACT

A signal from a system, such as a reactive system, that reflects health indicators of the system may be selected. A signal analyzer may extract the health indicators from the signal and conduct a diagnostics of the health of the system based on the health indicators.

16 Claims, 12 Drawing Sheets

ANALYSIS OF HEALTH INDICATORS OF A SYSTEM

BACKGROUND

Downtime of a complex reactive system (or system that responds to external events) is often costly due to lost productivity and expensive repairs. When the reactive system fails, effort is taken to ensure that the downtime is minimized. With the goal of minimizing downtime, reactive systems typically produce many logs of operation that contain multitudes of recorded data.

The logs of operation generally record data for any feature of the reactive system that can be monitored. The health of the system can probably be inferred from the logs of operation. However, a user of the reactive system may be bogged down with the sheer amount of recorded data and unable to determine the relevance of the data with regard to the health of the system.

An expert, in contrast, is able to recognize that different types of data have different levels of relevance with respect to the health of the system. Accordingly, the expert may rely on just a small portion of the multitudinous data to make a quick, accurate inference of the health of the system. Unfortunately, experts are rare, busy and expensive. Therefore, experts are not available to diagnose the health of every reactive system.

BRIEF DESCRIPTION OF THE DRAWINGS

Non-limiting and non-exhaustive examples or implementations of the subject disclosure are described with reference to the following figures, wherein like reference numerals refer to like parts throughout the various views unless otherwise specified.

DETAILED DESCRIPTION

Figure 1:
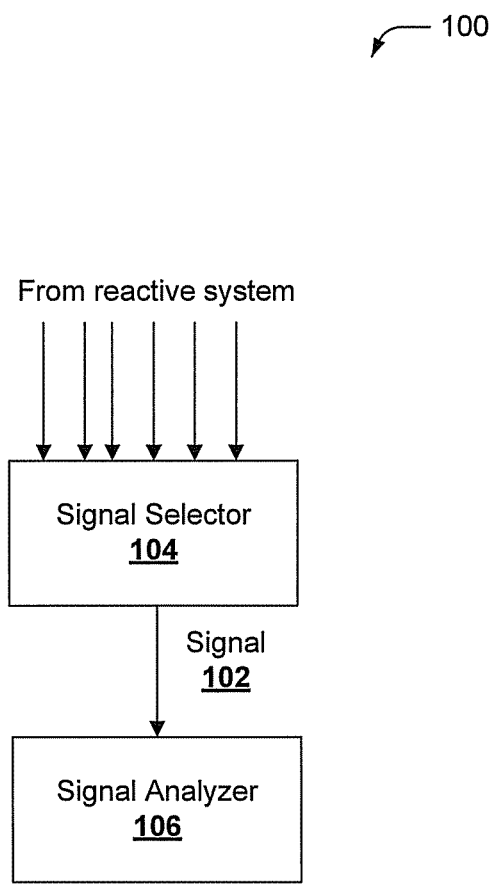
FIG. 1 is a schematic block diagram of a system that may quickly and accurately diagnose a health of a reactive system, according to an example of the subject disclosure.

In the following description, numerous specific details are set forth to provide a thorough understanding of the subject disclosure. One skilled in the relevant art will recognize, however, that the examples and implementations described herein can be practiced without each of the specific details, or with other methods, components, materials, etc. In other instances, well-known structures, materials, or operations are not shown or described in detail to avoid obscuring certain aspects.

According to an aspect of the subject disclosure, described herein is a diagnostic tool that provides automated diagnosis of a fault in a reactive system. The fault of a signal can be diagnosed through a "critical health indicator," an "indicator of health," an "indicator of faulty behavior," an "indicator of fault," or the like. The terms are used interchangeably in the specification to generally mean a signal that provides an indication of the health of a system.

A signal is chosen that reflects critical health indicators of the reactive system. The signal can reflect information from multiple sources, some of which reflect deviations from optimal operation (also referred to as problem-source signals). The problem-source signals can be mixed into a final signal without source-specific indication. The signal also can be initiated by the system (e.g., for maintaining all subsystems within working ranges). For system-initiated signals, signal specific information can be logged by the system and stored for future use.

The diagnostic tool can find the deviations from optimal operation by removing the effect of known system initiated actions and decomposing the remaining signal into its basic components (e.g. based on the problem-source signal(s)), each reflecting a certain type of deviation. The basic components can each be used as a health indicator.

Based on an analysis of the critical health indicators, the diagnostic tool can discover the root cause of the fault. Discovery of the root cause of the fault leads to better failure prediction and reduced downtime of the reactive system.

When used herein, the term "health status" refers to a determination of the operating status of a reactive system. For example, the health status reflects whether the reactive system is currently experiencing a fault, exhibiting signs that it will experience a fault in the future, or operating normally. The term "health of the system" can be used interchangeably with "health status" of the system.

In determining the health status, "critical health indicators," "indicators of faulty behavior," "indicators of faults" or "indicators of health" are analyzed. The critical health indicators are signals, values, or any other output of the reactive system that may lead to a determination of the health status of the reactive system. The critical health indicators can also be used to determine the root cause of a fault. Determining the root cause of a fault may expedite the repair of the fault and minimize downtime of the reactive system.

FIG. 1 illustrates a system 100 that automatically diagnoses a health of a reactive system quickly and accurately. A reactive system is any system that reacts to an internal or external event by changing its actions, outputs, conditions, statuses, or the like. Examples of reactive systems include, but are not limited to, mechanical systems, electronic systems, and biological systems. An example of a mechanical reactive system, a printing press, is used as an example; however, the description with regard to the printing press applies to other type of reactive systems.

When a fault occurs in a reactive system, an expert can often focus on the root cause of the fault quickly and accurately. The quickness and accuracy of the expert's analysis leads to the assumption that the expert needs only to inspect a few signals to find the root cause of the fault. System 100 employs the assumption that the expert needs only to visually inspect a few signals to find the root cause of the fault. Similar to the expert, system 100 discovers the root cause of the fault by an automated inspection of only a few signals.

System 100 can be better than the expert at fully analyzing the signal 102 or set of signals. An expert may be limited with regard to a full analysis of the signal 102 or set of signals. For example, frequently the strongest anomalous feature in the signal masks other weaker effects and prevents identification of the weaker effects both by inspection and feature detection unless the strong effect is removed. The practice of experts in this situation is to fix the strong effect and then re-acquire the signal to look for remaining problems. Accordingly, the expert troubleshooting procedure is often inefficient. System 100, however, may not suffer from this inefficiency since the weak effects can often also be seen through signal analysis.

System 100 recognizes that the reactive system generates a signal 102 or set of signals that reflect many critical health indicators for the reactive system. Similar to an electrocardiogram (ECG) signal that is used to diagnose the health of a person, the signal 102 (or set of signals) is used to diagnose the health status of the reactive system. The signal 102 or set of signals can be referred to as the ECG of the reactive system or the heartbeat of the reactive system.

The ECG of the reactive system reflects many of the critical health indicators of the reactive system. With regard to a printing press, the ECG of the reactive system is found in a single signal: the dynamic mirror signal. However, an ECG of other types of reactive systems can include any number of signals that reflect the critical health indicators.

System 100 includes a signal selector 104. The signal selector 104 selects the signal 102 or set of signals that correspond to the ECG of the reactive system. The signal selector 104 receives a plurality of signals from the reactive system and selects the signal 102 or set of signals that correspond to the ECG of the reactive system from the plurality of signals for further processing.

Upon selection by the signal selector 104, the signal 102 (or set of signals) is sent to the signal analyzer 106. The signal analyzer 106 automatically performs an analysis of the signal 104 that is similar to conventional automatic ECG analyses. In conventional ECG analysis, known indicators of faulty behavior are extracted from a pre-defined signal. The indicators of faulty behavior can facilitate diagnoses of health problems in humans. Similarly, the signal analyzer 106 facilitates the extraction of the critical health indicators from the signal 102 or set of signals. The critical health indicators facilitate diagnoses of the root cause of health problems in the reactive system.

Figure 2:
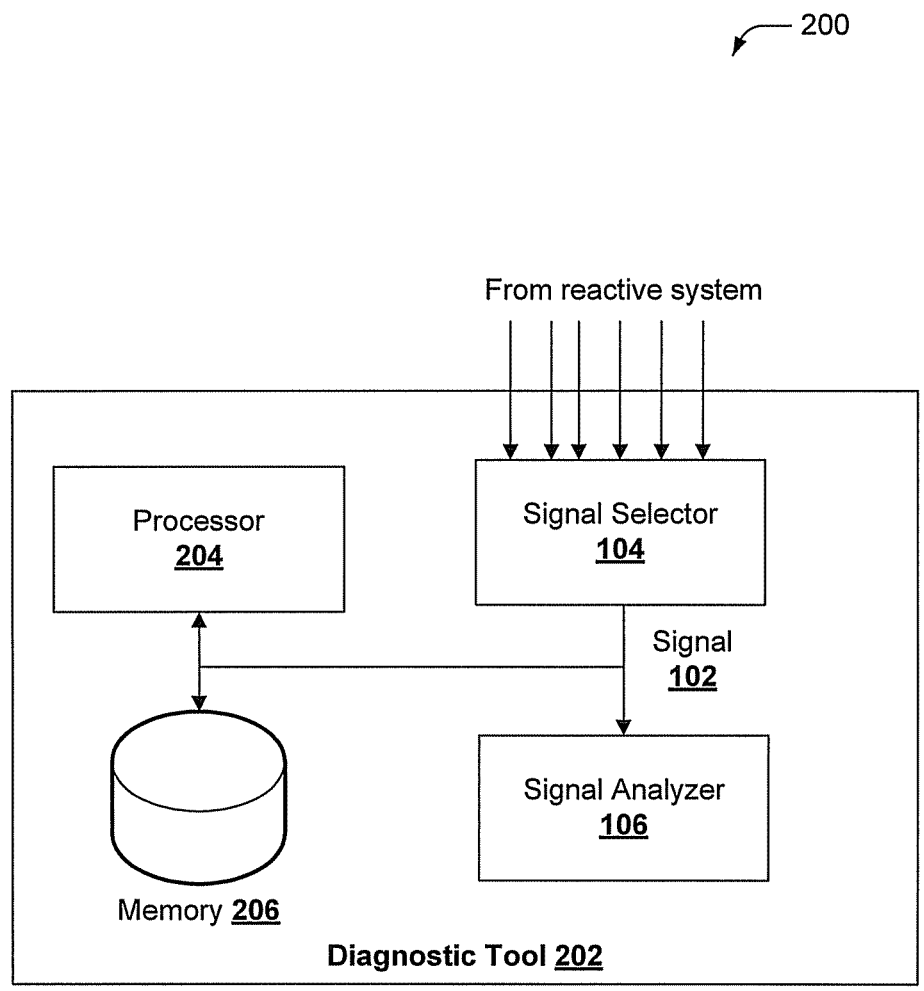
FIG. 2 is a schematic block diagram of a diagnostic tool that can automatically diagnose a health status of a remote reactive system, according to an example of the subject disclosure.

Referring now to FIG. 2, illustrated is a system 200 that facilitates diagnoses of health problems of a reactive system at a remote location. The diagnosis can occur during operation of the reactive system to detect faults, potential faults, or the like. The diagnosis can also occur before or during a development stage of the reactive system to ensure that there are no critical design faults.

The system 100 of FIG. 1 is included in a diagnostic tool 202. The diagnostic tool 202 is a stand-alone tool that is located remote from the reactive system. The diagnostic tool 202 has a processor (processor 204) that facilitates execution of the signal selector 104, the signal analyzer 106, and/or any additional components. The signal selector 104, the signal analyzer, and/or any additional components are machine-executable (e.g., computer-executable) components that are stored in one or more memory locations (memory 206) of the diagnostic tool 202.

Processor 204 can be any type of hardware device within a computing system that can carry out the instructions of a computer program by performing operations. Examples of hardware devices include, but are not limited to, a circuit board, an integrated circuit, any other type of microprocessor, or the like.

Memory 206 can be any type of hardware device or media that can store computer executable instructions. Example media that can act as memory include, but are not limited to: random access memory (RAM), read only memory (ROM), a hard drive, as well as removable memory devices, which can include memory sticks, memory cards, flash drives, external hard drives, and so on.

Figure 3:
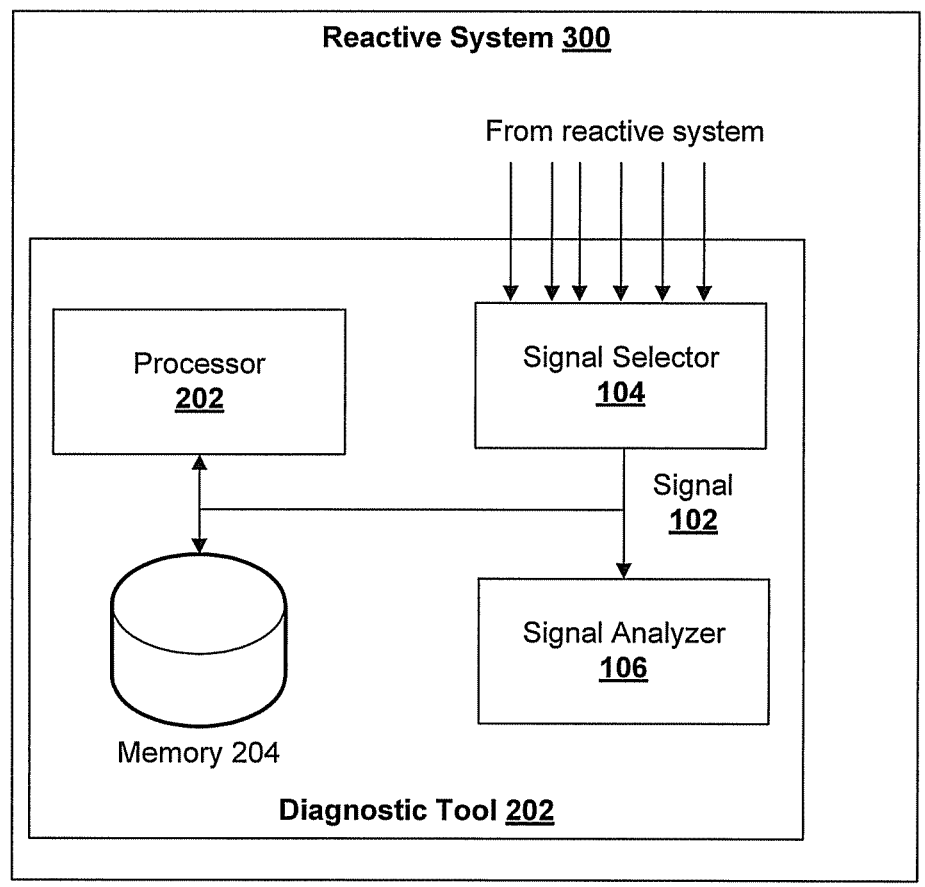
FIG. 3 is a schematic block diagram of a diagnostic tool that can automatically self-diagnose a health status of a reactive system, according to an example of the subject disclosure.

FIG. 3 shows a reactive system 300 with an embedded diagnostic tool 202. The embedded diagnostic tool 202 facilitates self-diagnosis of health problems of the reactive system 300. The self-diagnosis is automatic, based an analysis of the signal 102 or set of signals that contain many of the critical health indicators of the reactive system 300. The self-diagnosis can occur during operation of the reactive system to detect faults, potential faults, or the like. The self-diagnosis can also occur or during a development stage of the reactive system 300 to ensure that there are no critical design faults.

The following systems as illustrated in FIGS. 4-7 can be implemented in the diagnostic tool 202 of FIG. 2 or FIG. 3. The components of FIGS. 4-7 are stored in memory location (memory 206) of the diagnostic tool. The processor (processor 204) facilitates execution of the components of FIGS. 4-7.

The analysis of the signal 102 is performed by the signal analyzer 106. The signal analyzer 106 assumes that the observed health-related signal S' is a linear combination of multiple problem-specific reactive signals $S_k$, possibly some additional command signals $C_m$, and some background noise. Each of the signals $S_k$ is assumed to be related to a single cause of system performance/health problem.

For example $S_1$, $S_2$ could correspond to two vibration-modes having different frequencies, while $S_3$ could correspond to mean-velocity drift, and $S_4$, $S_5$ could correspond to mechanical shocks at different points in time (e.g. when paper is loaded and when it is emitted). While $S_k$ reflects directly the deviation of system components from optimal behavior, $C_m$ reflects system initiated signals (e.g. for keeping components in range).

There may be a set of problem-specific families that are likely to occur in conjunction with various types of problems. In the example above, vibration modes, drift, and shocks may be such a problem-specific family. An expert with respect to the reactive system may provide such problem-specific sets.

First, the principally known command signals ($C_m$) are eliminated ($C_m$: $S=S'-\Sigma_m C_m$).

Then, S is decomposed to find all $S_k$'s.

Traditionally, the detection of such signals is considered for the case of a single signal-family (e.g., Fourier-analysis for vibrations). Mathematically, such a single signal family corresponds to a "complete orthonormal basis" such that any signal can be completely represented by a linear combination of the basis-signals (frequencies in the case of Fourier analysis), and the basis signals $B_n$ are normalized orthogonal to each other, such that the inner-products $B_n \cdot B_m$ are all zero except when m=n, where they are equal to 1. For two signals, the inner-product is the sum of their point-wise product values. Any signal S is decomposed in any orthonormal basis B as $S = \Sigma_n s_n B_n$ where $B_n$ is the $n^{th}$ basis signal. The amplitude of component $B_n$ is obtained by a simple inner-product operation $s_n = S \cdot B_n$. Each term in the linear decomposition above, $S_n = s_n B_n \equiv S \downarrow B_n$, is referred to as the "orthogonal projection" of S onto $B_n$, so that the signal S is expressed as a sum of its orthogonal projections on all the basis signals. The detection of problems in this classical process is done by looking for components with amplitudes $s_n$ above some threshold that corresponds to normal operation conditions. In this orthogonal-projection based framework, signals that do not correlate to a pure basis function have non-zero amplitudes in many or all basis signals and are considered as a noise source regarding the detection of problems corresponding to the basis B (e.g., a series of spikes constitutes noise with regards to detection of vibrations with certain frequencies). If the amplitude of a basis component is low but the noise level in that component due to some other mechanism is higher than a preset threshold or higher than the amplitude of other basis components, the analyzer may falsely declare a problem in that component. Such is the case, for example, with Frequency analysis of the raw dynamic-mirror signal before removing the velocity drift component. The velocity drift contaminates the lower part of the spectrum and gives rise to high amplitudes for low frequency basis signals—making it hard to detect true low-frequency problematic vibrations, or giving rise to excessive false alarms for low-frequency vibrations.

The signal analyzer 106 provides a way to overcome such problem detection inefficiencies by considering multiple signal-families together as an over-complete basis (i.e. there are multiple ways to express each given signal as a linear combination of basis signals). Over-complete bases are no longer orthogonal in the sense that basis signals belonging to different orthogonal families are not orthogonal between themselves. While there is classical prior works on non-orthogonal (oblique) decomposition in over-complete bases, they consider linear oblique projections using a standard technique of "singular value decomposition" SVD. Unfortunately the linear oblique projection methods are known to be less stable than orthogonal projections and enhance noise, since they tend to enhance components across all basis types in a single inseparable step. In particular, linear oblique projections are not suitable for discovering weak problem signals riding on stronger problem-signals, since other random weak signals corresponding to noise would be enhanced too and the detection of the weak-problem signal would have high error rates.

The analysis method yielding a non-linear and stable (noise relisient) approximation of oblique projection onto an over-complete problem-signal basis, so the advantages of signal decomposition are retained by over-complete signal basis, while avoiding the pitfalls of linear oblique projections. The analysis method is based on two major principles. The first principle is to break the decomposition operation into an iterative process such that each step involves an orthogonal projection onto one the signal-families combined with detection and removal of projected components stronger than the noise level, and passing the residual signal to the next step.

The second principle is to carefully choose the order of the signal-families to process, such that stronger components are likely to detected and removed first. The selection of the projection-order could be done by the system-expert in case there is a clear ordering of the problem signal strength for different problem-signal families. Alternatively the order could be found automatically and adaptively for each new signal by trying orthogonal projection onto each of the problem-signal families and choosing the projection with largest signal energy above the background noise level or largest signal to noise ratio.

The analysis method does rely on some reasonable assumptions that the correlation between different problem-signal families is relatively low—i.e. that the magnitude of inner products between basis-signals from different families is much smaller than 1. This assumption corresponds to the reasonable assumption that an expert would be able to differentiate between signals characteristic to different problem-types by their shapes. If the measured signals look the same for different types of problems, they would not be identified separately even by a human expert. In practice in the type of problem signal families described herein, the magnitude of between-family inner-products is less than 0.35 and most are smaller than 0.1 which is consistent with the assumption.

This method provides a good and stable approximation to oblique projection. Assume that signal S is composed of two main problems—signals corresponding to two different problem types $s_{1n}$, $s_{2k}$, such that the amplitude of the second one is considerably smaller than the first. In addition the signal contains a multitude of noise components $V_j$ that are not related to these two problems, but that have a small inner-product with $s_{1n}$, $s_{2k}$ amplitude in any of the bases $s_1$ or $s_2$. Hence the example signal can be expressed as:

$$S = a_{1n} s_{1n} + a_{2k} s_{2k} + \Sigma_{j>2} V_j \text{ (where } s_{1n} \cdot V_j = C_{1j}, s_{2k} \cdot V_j = C_{2j}$$
$$\text{such that } C_{1j}, C_{2j} << a_{2k} << a_{1n}).$$

In the first step of an algorithm that can facilitate the analysis method, an orthogonal projection of S is applied onto the larger component, $s_{1n}$:

$$A_{1n} = S \downarrow B_1 = S \downarrow s_{1n} = a_{1n} + a_{2k} c_{12} + \Sigma_{j>2} C_{1j}.$$

Where $c_{12}$ is the inner-product of the non-orthogonal basis unit vectors $c_{12} \equiv s_{1n} \cdot s_{2k}$.

$A_{1n}$ can be taken as an approximation of the true amplitude (for detection purposes). The corresponding relative-approximation error contains two terms, one corresponding to the relation between the two signal components, and the second corresponding to the relation between the noise components and the first signal:

$$\delta_{1n} = (A_{1n} - a_{1n})/a_{1n} = c_{12} \cdot a_{2k}/a_{1n} + \Sigma_{j>2} C_{1j}/a_{1n}.$$

Based on the assumptions above, the first term is much smaller than 1, due to approximate orthogonality ($c_{12} << 1$) and the majorness of $a_{1n}$ ($a_{2k}/a_{1n} < 1$). As for the second term corresponding to the noise, one cannot provide an absolute upper limit without additional knowledge about the noise. However if the noise components are uncorrelated between themselves or with the signal $a_{1n}$, then the energy of the second term is guaranteed to be smaller than the energy of the original noise (before projection). An important property here is that the relative error due to the second signal is very small, and the noise is not enhanced like in linear oblique projection.

In the next step, the signal component $s_{1n}$ is declared as detected if $|A_{1n}|$ is larger than some threshold T corresponding to the expected noise level $E\{V_j^2\}$. If detection is positive, the projection $S_{1n} = A_{1n} s_{1n}$ is removed from the measured signal, leaving the residual $R_1 = S - A_{1n} s_{1n} = a_{2k}(s_{2k} - c_{12} s_{1n}) + \Sigma_{j>2}[V_j \perp s_{1n}]$ (where $[V_j \perp s_{1n}] = V_j - C_{1j} s_{1n}$ are the noise components orthogonal to the basis signal $s_{1n}$).

Note that the residual $R_1$ does not depend on $a_{1n}$ (the real magnitude of the signal component $s_{1n}$). This feature is used to obtain an approximation of the magnitude of the component $s_{2k}$ that does depend on the magnitude of the larger component $a_{1n}$. To do this, the residual $R_1$ is projected onto $s_{2k}$:

$$i\, A_{2k}=R_1\downarrow s_{2k}=a_{2k}-a_{2k}c_{12}^2+\Sigma_{j>2}[V_j\perp s_{1n}]\cdot s_{2k}= a_{2k}(1-c_{12}^2)+\Sigma_{j>2}[C_{2j}-C_{1j}C_{12}]$$

In particular, the relative approximation error for $a_{2k}$:

$$\delta_{2k}=(A_{2k}-a_{2k})/a_{2k}=c_{12}^2+\Sigma_{j>2}\Sigma_{j>2}[C_{2j}-C_{1j}c_{12}]/a_{2k}.$$

The part of the relative approximation error due to non-orthogonally of the two signal components due $c_{12}^2$, is much smaller than 1 according to the assumption above (maximum of ~0.1, and usually 0.01 or less). The second term in the relative approximation error corresponds to the projection of the noise component that is orthogonal to $s_{1n}$ and along $s_{2k}$. The noise energy is again smaller than the original noise energy—unlike the noise enhancement effect of linear-oblique projection. Similar to the detection step above, the component $s_{2k}$ is declared as detected if $|A_{2k}|$ is larger than the noise threshold T.

It should be clear that if there are more signal components with weaker magnitudes, then eventually those components that have energy comparable to or weaker than the noise would not be detected. Yet the detection of those signal components above the noise level would not suffer from the mixing with other signals that are slightly non-orthogonal even if their energy is larger, as long as the stronger signal components are detected and removed first.

Figure 4:
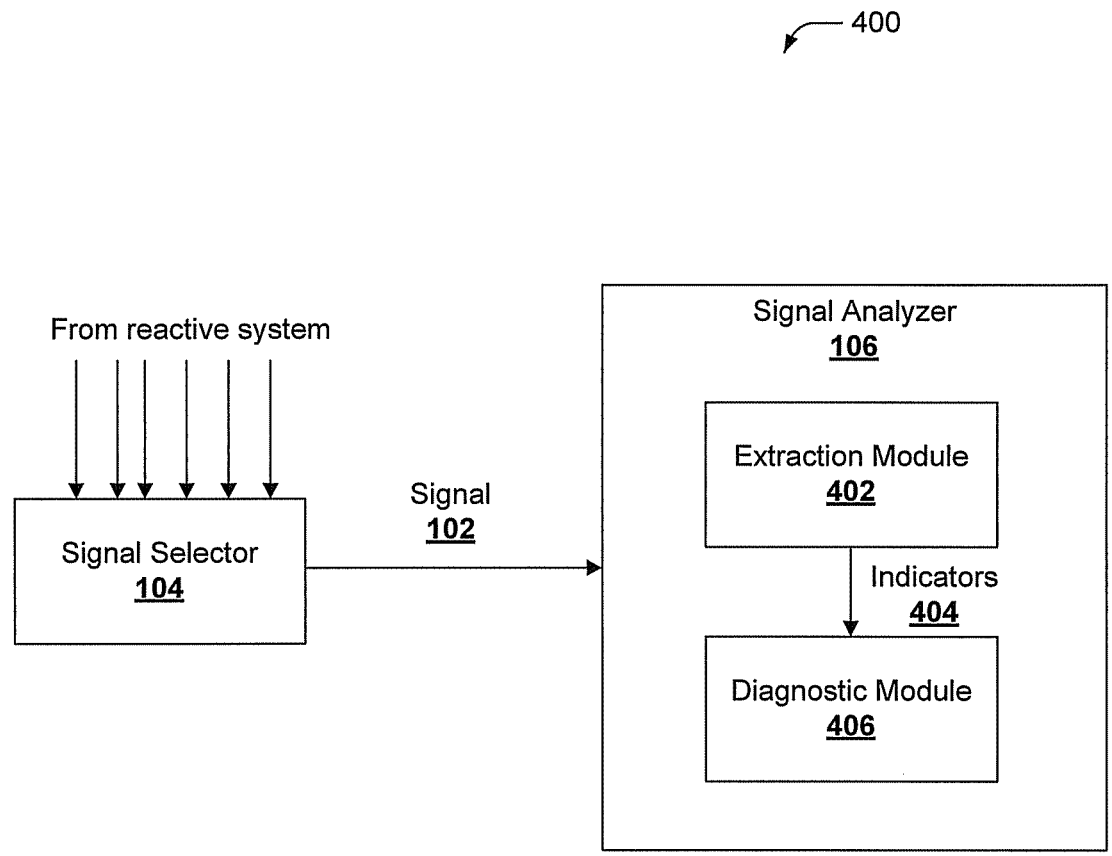
FIG. 4 is a schematic block diagram of a system that extracts health indicators of a reactive system from a signal to facilitate health diagnostics of the reactive system, according to an example of the subject disclosure.

Illustrated in FIG. 4 is a system 400 that extracts critical health indicators of a reactive system from a signal to facilitate diagnoses of the health of the reactive system. System 400 includes a signal selector 104 that selects a signal 102 or set of signals that contain many of the critical health indicators of the reactive system. The signal 102 (or set of signals) is sent to a signal analyzer 106.

The signal analyzer 106 includes an extraction module 402 that facilitates extraction of the critical health indicators 404 from the signal 102 or set of signals. Based on the critical health indicators 404, the system analyzer 106 employs a diagnostic module 406 to diagnose a health status of the reactive system. The diagnosis provides a good snapshot of the reactive system.

The signal analyzer 106 uses prior knowledge of an expert that a signal 102 or set of signals reflects many of the critical health indicators 404 of the reactive system to automatically diagnose 406 the health status of the reactive system. The signal analyzer 106 enables a non-expert to quickly and accurately solve complex diagnostic problems of the reactive system, reducing the downtime of the reactive system and the costs of incorrect diagnoses. Signal analyzer 106 provides automatic diagnoses 406 of the root cause of any faults, which reduces the need for rare, busy, and expensive experts.

Figure 5:
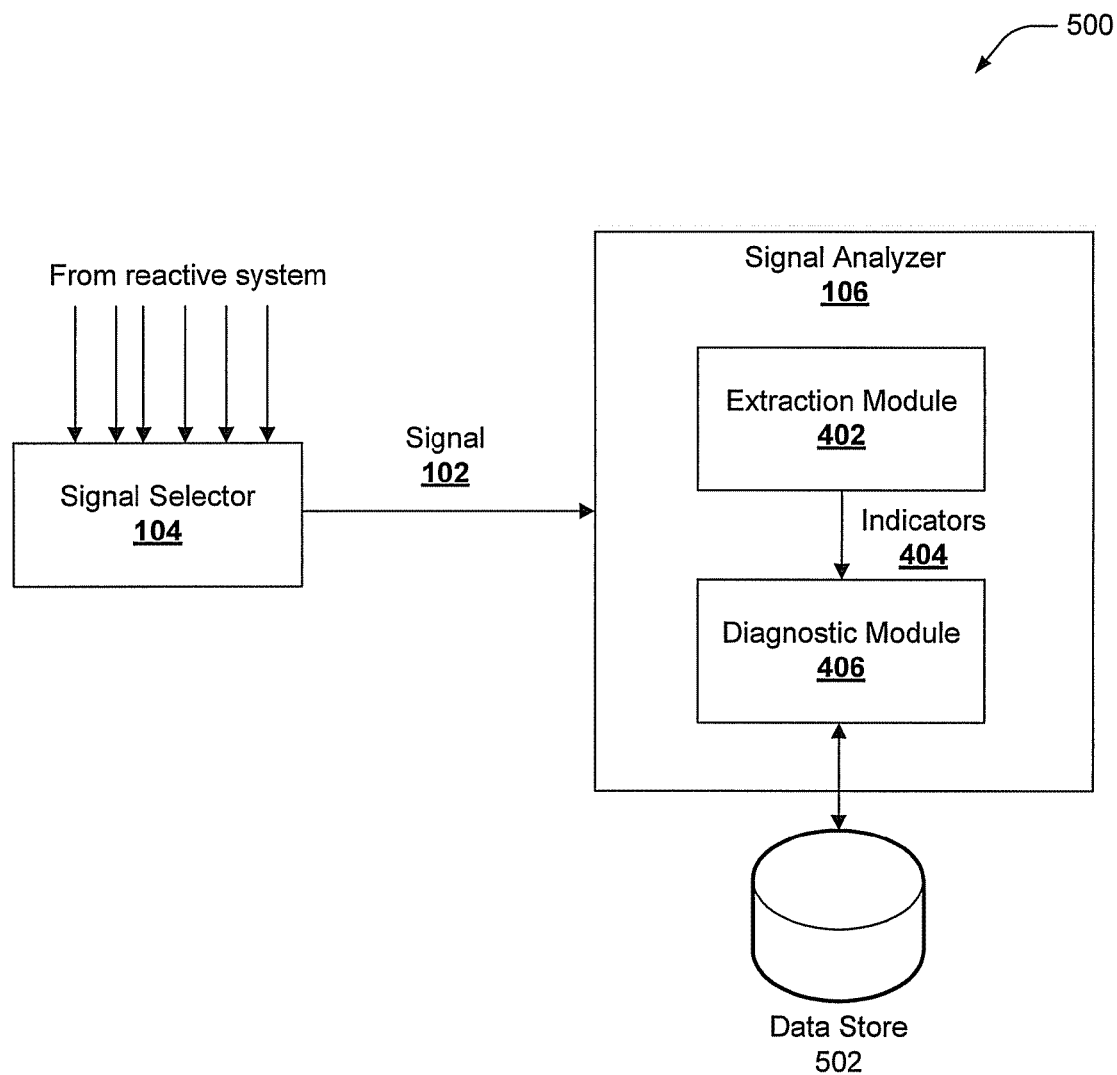
FIG. 5 is a schematic block diagram of a system that searches a data store for diagnostic information to facilitate diagnostics of a reactive system according to health indicators that are extracted from a signal, according to an example of the subject disclosure.

Referring now to FIG. 5, illustrated is a system 500 that searches a data store 502 for diagnostic information to facilitate a diagnosis of a reactive system according to critical health indicators 404 that are extracted from a signal 102 or set of signals. Data store 502 is a knowledge base of different faults for the reactive system, such that data store 502 includes a list of known faults and their corresponding symptoms. The symptoms correspond to different critical health indicators 404.

Data store 502 is generally any type of data repository that can store data in a schema or plurality of schemas and also includes any data repository that can store flat data without a schema. Data store 502 can also refer to any type of "memory" device.

System 500 allows an expert's knowledge base to be used by a non-expert without the need for actually engaging the expert. The data store 502 corresponds to a knowledge base of an expert. In one example, an expert may populate the data store 502 with the known faults and corresponding symptoms.

In another example, faults and corresponding system can be determined through machine learning technologies and the data store 502 can be populated with the information automatically or after review by an expert. For example, when new faults are diagnosed and/or different corresponding symptoms are identified, the system 500 learns of the diagnosis and/or identification and adds the new fault and/or symptom to the data store 502. The data store 502 can learn of the diagnosis and/or identification and add the new fault and/or symptom to the data store 502 automatically. The data store 502 can also be populated with the new fault and/or symptom manually (for example, through periodic updates from an expert).

Figure 6:
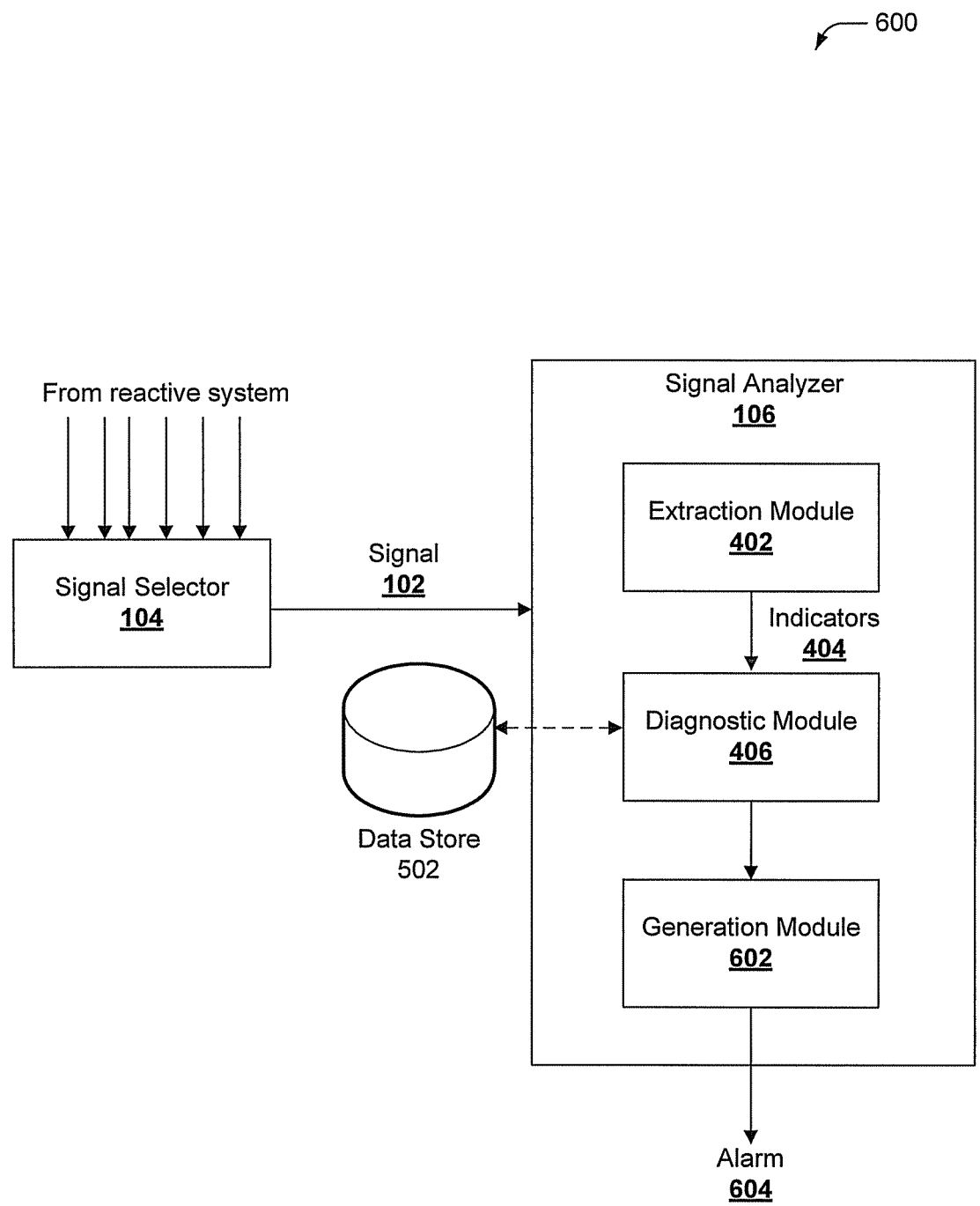
FIG. 6 is a schematic block diagram of a system that generates an alarm upon diagnosis of a fault in a reactive system based on health indicators that are extracted from a signal, according to an example of the subject disclosure.

FIG. 6 illustrates a system 600 that alerts a user of a potential health problem in a reactive system. The system 600 generates an alarm 604 through a generation module 602 upon the diagnosis of a fault in the reactive system. The alarm 604 can also be generated through the generation module 602 upon detection of a trend in critical health indicators 404 that are extracted from a signal 102 or a set of signals that indicates a potential future fault. When an alarm 604 is generated by the generation module 602 upon detection of a suspicious pattern in the indicators 404, proactive preventative actions can be taken before the fault occurs, reducing downtime and associated costs.

Figure 7:
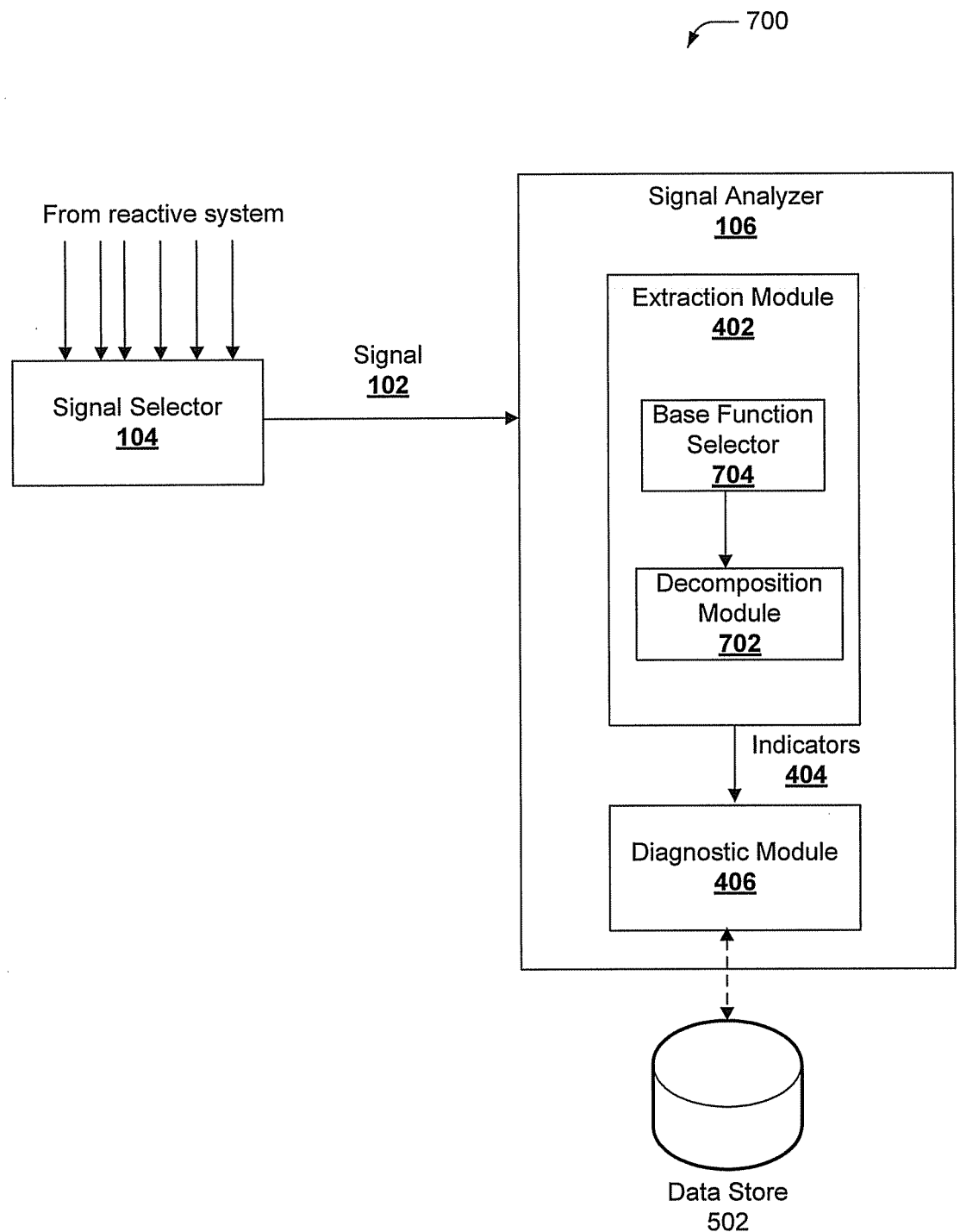
FIG. 7 is a schematic block diagram of a system that decomposes a signal into health indicators for diagnosis of the health of a reactive system, according to an example of the subject disclosure.

FIG. 7 illustrates a system 700 that automatically diagnoses the health status of a reactive system. System 700 includes a signal analyzer 106 that decomposes through a decomposition module 702 a signal 102 or set of signals into critical health indicators 404. The signal analyzer 106 can diagnose a health status of the reactive system based on the critical health indicators 404. The signal analyzer 106 can consult a data store 502 to find a fault condition that corresponds to the critical health indicators 404 or symptoms. System 700 allows both experts and non-experts alike to monitor and correct the reactive system.

The signal analyzer 106 assumes the critical health indicators 404 for the reactive system add linearly to form the signal 102 or set of signals. In other words, signal 102 (or the set of signals) is assumed to be a decomposition of basic signals that refer to the critical health indicators 404. Since the critical health indicators 404 add linearly, the signal 102 or set of signals can be additively decomposed.

By clever selection of base functions (e.g., through the base function selector 704), the decomposition can be performed in a way such that all fault sources of the system can be detected through the critical health indicators 404. To perform the decomposition, an over complete basis is chosen so that the base functions enhance known fault causes. The choice of base functions enhances the root causes of the faults and facilitates automatic detection of the root causes.

The base functions can be predefined for different signals 102 from different reactive systems according to an expert's knowledge. Base functions can also be derived from the signal 102 or set of signals. For example, base functions can be derived from the signal 102 or set of signals by applying sparse representation techniques.

The effectiveness of system 700 is exemplified by testing with a Hewlett-Packard Company® (HP) Indigo press. Experts have identified one signal 102 that contains the critical health indicators 404 of main mechanical and electronic components of the Indigo press: the correction command signal to the dynamic mirror (or dynamic mirror signal).

In the Indigo system, the dynamic mirror is part of the wiring head that creates the image on the photo imaging plate (PIP). The dynamic mirror shifts laser beams with or against the process rotation direction in order to compensate for changes in speed and angular position of the PIP due to mechanical and electrical imperfections.

In an ideal press, the angular position of the PIP should follow a smooth, linearly increasing line (modulo 360 degrees), with a slope depending on the nominal angular speed of the system. In such a system, the dynamic mirror correction command would be a constant signal with no correction. However, for an actual press there are often discrepancies from this ideal situation. Dynamic mirror compensations are used to correct for the discrepancies.

The dynamic mirror compensates for cumulative effects contributing to deviations in PIP velocity. When the press behaves properly, the dynamic mirror corrects for small deviations. When faults occur, the dynamic mirror corrects for larger deviations, possibly going out of the mirror's range. Because the dynamic mirror compensates for cumulative effects contributing to PIP velocity deviations, the correction command signal reflects all of the cumulative effects.

The signal is pre-processed to remove the command signals or signals from system components as described above. It is assumed that all factors of the pre-processed signal that contribute to the error add linearly. Therefore, a linear decomposition can be performed (e.g., by a signal analyzer 106 with a decomposition module 702) on the correction command signal. The linear decomposition is performed in a clever way, facilitating detection of all of the fault sources using one measurement so that all of the fault sources can be addressed at once.

Figure 8:
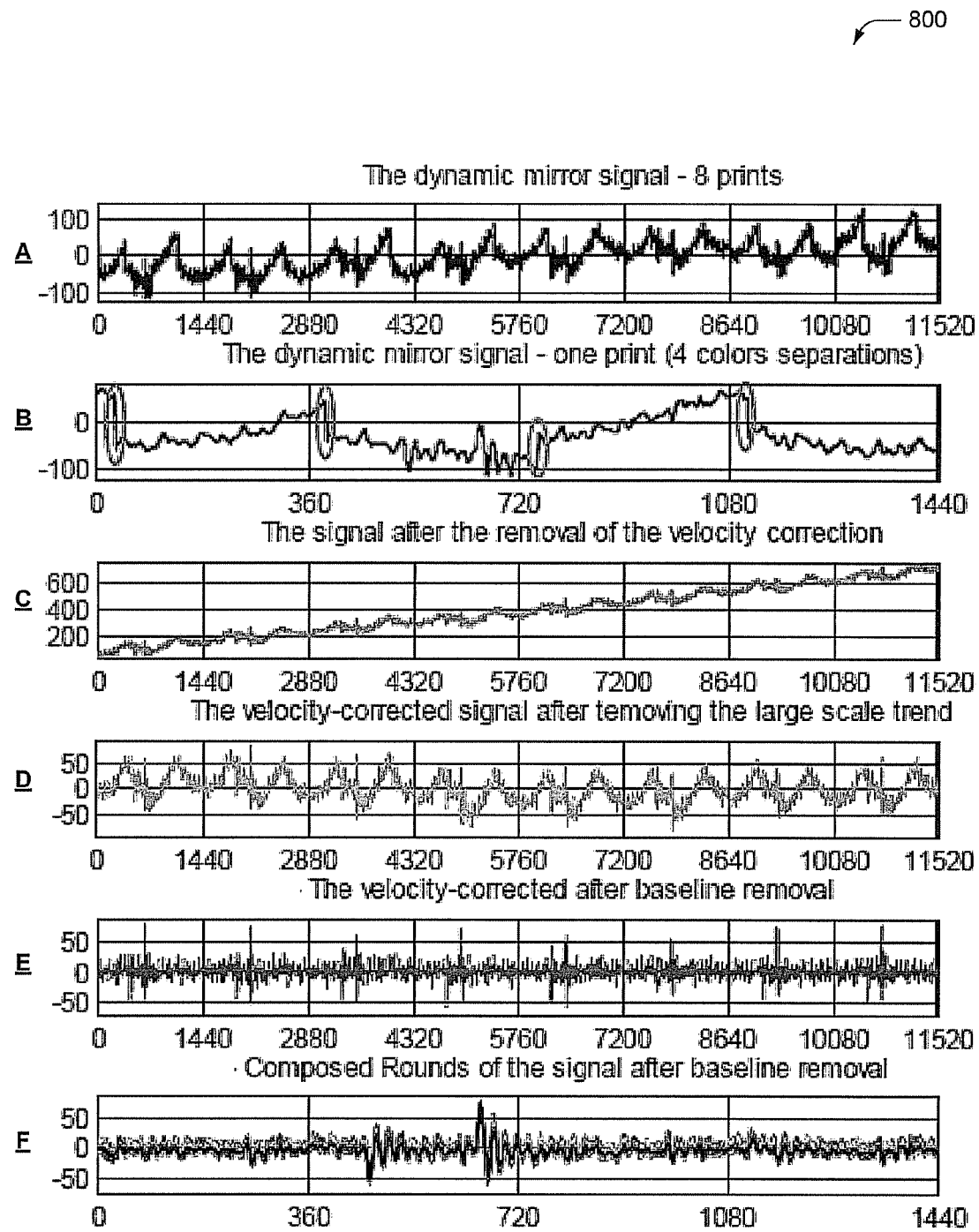
FIG. 8 illustrates an example time-domain analysis of a dynamic mirror signal from a press system, according to an example of the subject disclosure.

To perform the decomposition, an over complete basis with base functions that enhance the known fault causes is employed (e.g., selected by the base function selector 704). FIG. 8 illustrates an example analysis (that can be performed, for example, by signal analyzer 106) of the correction command signal (or dynamic mirror signal) that can be selected by signal selector 104 as the signal 102 for which the analysis is based.

In FIG. 8A, a portion of the raw dynamic mirror signal taken from a HP Indigo 5000 press is plotted. This signal can correspond to signal 102. The x-axis is the time converted to degrees. 360 degrees refers to a full revolution of the blanket drum and corresponds to a single separation.

FIG. 8B corresponds to printing a full 4-separation page. Periodic jumps in the signal (dynamic mirror signal, corresponding to signal 102) are clearly seen (marked by circles for emphasis). The jumps indicate the displacement correction commands: every separation in the mirror corrects for large displacement deviations of the PIP so as to keep the mirror displacement within bounds. These deviations are caused by deviations of the mean angular velocity of the PIP from the nominal velocity.

FIG. 8C shows the raw signal after the removal of velocity corrections. Here, the velocity deviation is apparent and the mean deviation from the nominal speed can be calculated using a linear approximation or, if necessary, wavelet approximation to the relevant scale.

FIG. 8D shows the signal after further removal of the linear trend. A two-separation harmonic period is clearly shown.

FIG. 8E shows the same signal after the baseline wander is removed using robust nonlinear filtering. Here, the repeating shocks are clearly seen every 4 separations.

FIG. 8F shows composed periods of the signal shown in FIG. 8E. This period-to-period analysis enhances the repeating patterns. The repeating patterns appear in all of the periods, while non-repeating patterns do not appear in all of the periods. The dark, thick line is the median of the signals, emphasizing the shocks that represent opening and closing of paper grippers.

Figure 9:
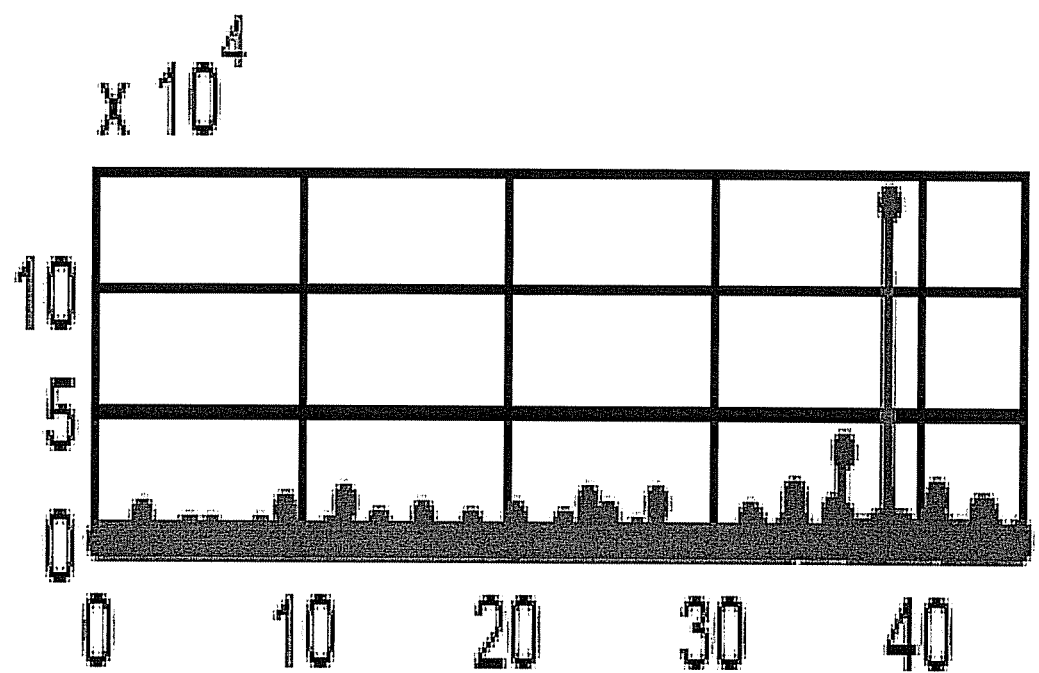
FIG. 9 illustrates an example frequency-domain analysis of a dynamic mirror signal from a press system.

Many faults in the Indigo press are manifestations of harmonic perturbations. These perturbations are easily detected by applying a Fourier transform to the signal of FIG. 8B (e.g., by signal analyzer 106). FIG. 9 shows the Fourier amplitude of the velocity corrected dynamic mirror signal after the baseline removal. A peak at 38.5 Hz is evident, emphasizing the root cause of the fault that can be sensed by diagnostic module 406.

Figure 10:
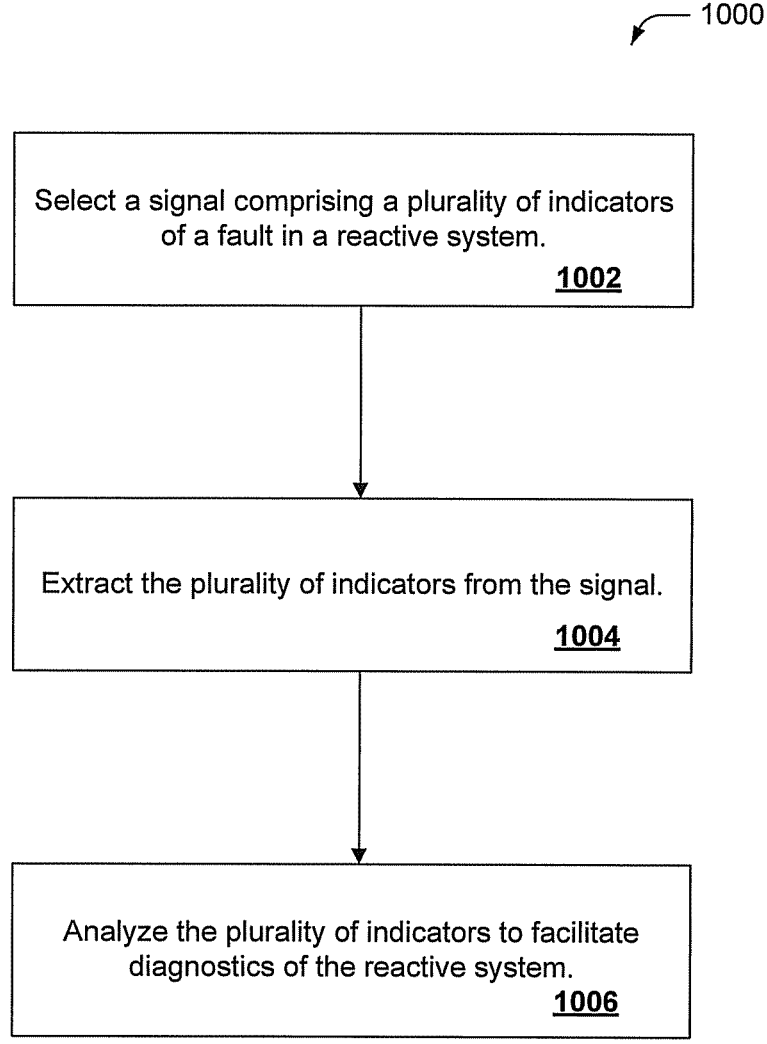
FIG. 10 is a schematic process flow diagram of a method for diagnosing errors in a reactive system, according to an example of the subject disclosure.
Figure 11:
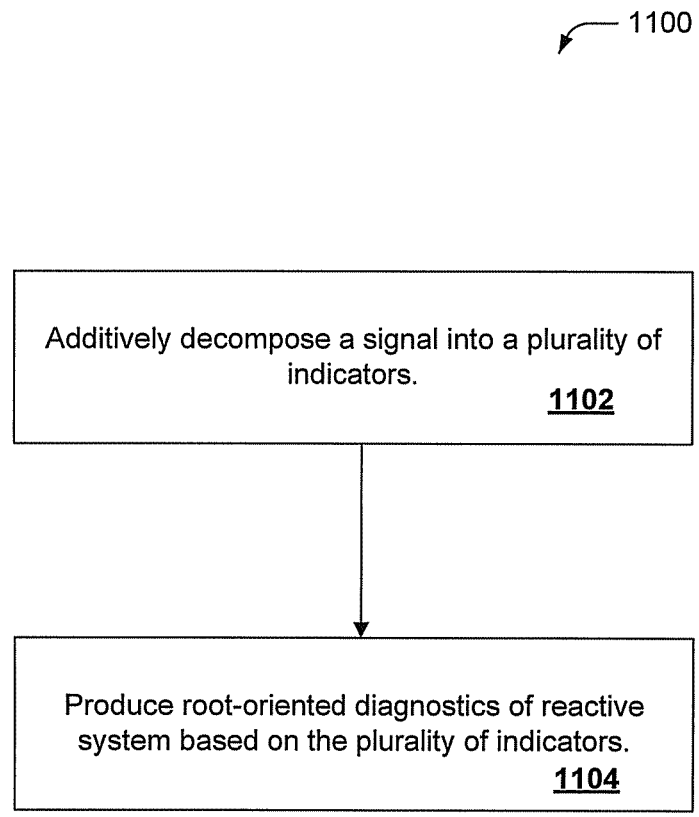
FIG. 11 is a schematic process flow diagram of a method for decomposing a signal to extract health indicators, according to an example of the subject disclosure.
Figure 12:
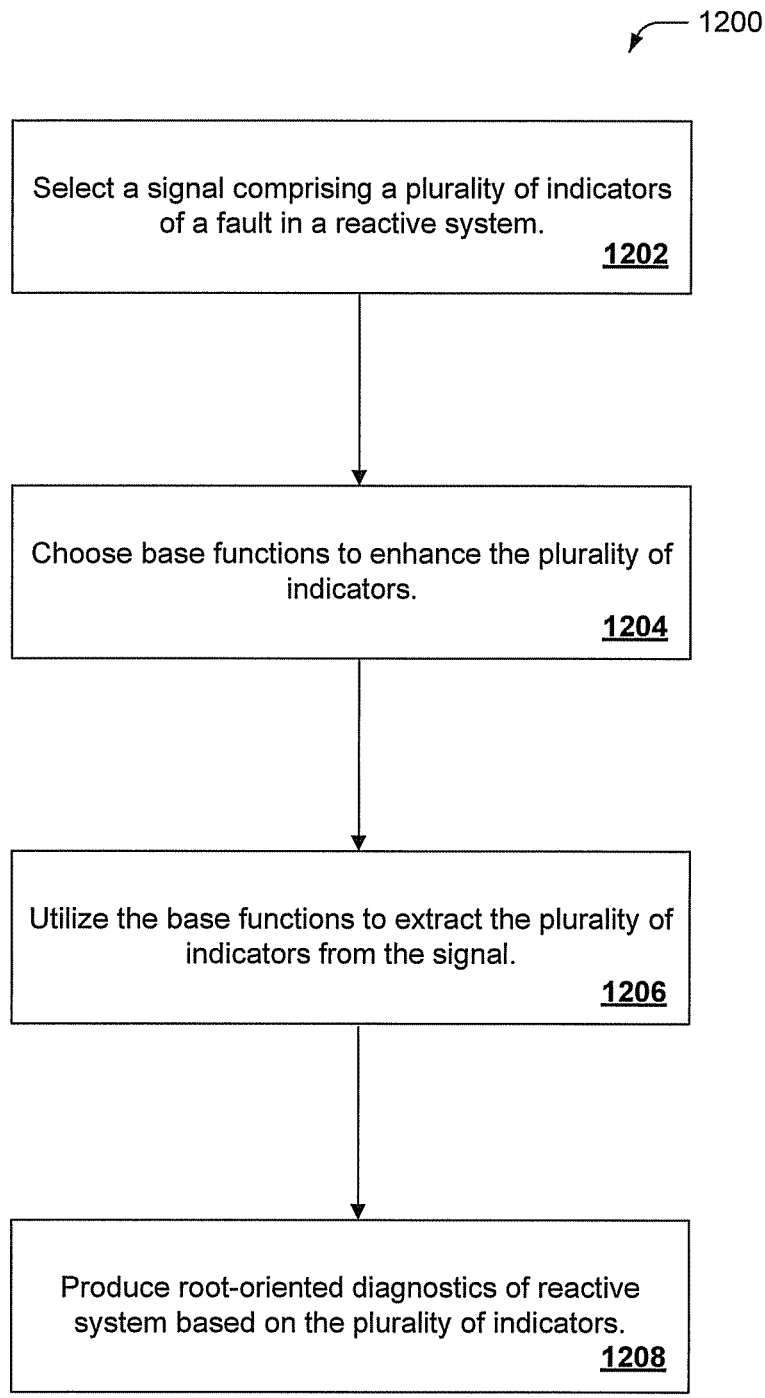
FIG. 12 is a schematic process flow diagram of a method for decomposing a signal to extract health indicators utilizing base functions, according to an example of the subject disclosure.

FIGS. 10, 11 and 12 show methods illustrated as flow diagrams. For simplicity of explanation, the methods are depicted and described as series of acts. However, the methods are not limited by the acts illustrated and by the order of acts. For example, acts can occur in various orders and/or concurrently, and with other acts not presented and described herein. Furthermore, not all illustrated acts may be required to implement the methods. Additionally, it should be further appreciated that the methods can be implemented on an article of manufacture (e.g., a non-transitory computer-readable storage medium) to facilitate transporting and transferring the methods. These methods may be implemented by any suitable system or apparatus, such as described in FIGS. 1-7.

Referring now to FIG. 10, illustrated is a schematic process flow diagram of a method 1000 for diagnosing errors in a reactive system. Method 1000 can facilitate automatic diagnosis of the root cause of system faults, design flaws of the system, or the like, without requiring an expert.

An expert can focus on the root cause of a fault quickly and accurately, utilizing only a signal or set of signals. The signal or set of signals analyzed by the expert are referred to as the "heartbeat" of the reactive system. The "heartbeat" is a signal that reflects most of the critical health indicators in the reactive system.

At element 1002, a signal (or set of signals) is selected as the "heartbeat" of a reactive system that includes most of the critical health indicators of a fault in the reactive system. At element 1004, the critical health indicators are extracted from the signal. FIGS. 11 and 12 illustrate decomposition methods 1100 and 1200 for extracting the critical health indicators of the system. At element 1006, the indicators are analyzed to facilitate diagnostics of the reactive system.

For example, the indicators can be symptoms of a health problem of the system. The symptoms can be input into a database that includes various health problems of the system and corresponding symptoms. The symptoms can be matched to a health problem. The health problem can be output (e.g., on a screen or display) along with instructions for fixing the problem.

Referring now to FIG. 11, illustrated is a schematic process flow diagram of a method 1100 for decomposing a signal to extract critical health indicators, with the assumption that the critical health indicators add linearly within the signal. In other words, the heartbeat signal (or the set of heartbeat signals) is assumed to be a decomposition of basic signals that refer to the critical health indicators. Since the critical health indicators are assumed to add linearly, the signal or set of signals can be additively decomposed.

At element 1102, the signal is additively decomposed into the plurality of indicators. By clever selection of base functions, the decomposition can be performed in a way such that all fault sources of the system can be detected through the critical health indicators. To perform the decomposition, an over complete basis is chosen so that the base functions enhance known fault causes. The choice of base functions enhances the root causes of the faults and facilitates automatic detection of the root causes.

The base functions can be predefined for different signals from different reactive systems according to an expert's knowledge. Base functions can also be derived from the signal or set of signals. For example, base functions can be derived from the signal or set of signals by applying sparse representation techniques.

At element 1104, based on the decomposed indicators, a root-oriented diagnostics is performed on the reactive system. The base functions are chosen to enhance the extraction of the critical health indicators. The root oriented analysis can be accomplished through an analysis of the critical health indicators.

Referring now to FIG. 12, illustrated is a schematic process flow diagram of a method for decomposing a signal to extract critical health indicators utilizing base functions. At element 1202, a signal is selected that includes the plurality of indicators. At element 1204, base functions are chosen. The base functions can be pre-selected by an expert or based on the signal itself. The base functions are chosen so to enhance the root cause of the fault. At element 1206, the base functions are used to extract the indicators from the signal. At element 1208, a root-oriented diagnostics is performed on the reactive system based on the plurality of indicators.

The above description of illustrated examples, including what is described in the Abstract, is not intended to be exhaustive or to limit the disclosed examples to the precise forms disclosed. While specific examples and examples are described herein for illustrative purposes, various modifications are possible that are considered within the scope of such examples and examples, as those skilled in the relevant art can recognize.

As used herein, the word "example" is used to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the described subject matter has been described in connection with various examples and corresponding Figures, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims.

What is claimed is:

1. A system, comprising:
   at least one memory storing computer-executable instructions;
   at least one processor, communicatively coupled to the at least one memory, that facilitates execution of the computer-executable instructions to at least:
   decompose a signal generated by a reactive system to extract a plurality of indicators of health of the reactive system, by:
      determining a plurality of orthogonal projections of the signal, each orthogonal projection corresponding to a signal family included in the signal;
      iteratively processing the orthogonal projections in descending signal strength order, where in each of a plurality of iterations a component of the signal corresponding to the signal family of the orthogonal projection being processed is removed before proceeding to any next iteration; and
   determine a health status of the reactive system based on an analysis of the plurality of indicators.

2. The system of claim 1, wherein the at least one processor further facilitates execution of the computer-executable instructions to choose basis functions for the signal with the assumption that the signal is a linear combination of the plurality of indicators.

3. The system of claim 1, wherein the at least one processor further facilitates execution of the computer-executable instructions to detect a pattern within the plurality of indicators to indicate a fault.

4. The system of claim 1, wherein the at least one processor further facilitates execution of the computer-executable instructions to decompose the signal to its basis functions using successive steps, each of the successive steps comprising an orthogonal projection onto one family of basis functions combined with removal of a projected signal component, wherein a projection order is determined by a relative strength of components of each of the basis functions.

5. An apparatus comprising:
   a memory storing machine-executable components comprising:
   a signal selector to identify a signal that includes a plurality of known indicators of faulty behavior of the apparatus;
   a signal analyzer to extract the known indicators from the signal and to perform a self-diagnostic based on the known indicators; and
   a health determiner to determine a health status of the apparatus based on the self-diagnostic performed by the signal analyzer,
   wherein the signal analyzer is to determine a plurality of orthogonal projections of the signal that each correspond to a signal family included in the signal, and is to iteratively process the orthogonal projections in descending signal strength order, where in each of a plurality of iterations a component of the signal corresponding to the signal family of the orthogonal projection being processed is removed before proceeding to any next iteration.

6. The apparatus of claim 5, wherein the signal analyzer is configured to perform the self-diagnostic by comparing the known indicators to values stored in a database of potential faults of the apparatus.

7. The apparatus of claim 5, wherein the signal analyzer is configured to extract the known indicators by decomposing the signal into the known indicators.

8. The apparatus of claim 7, wherein the signal is a linear combination of the known indicators.

9. The apparatus of claim 5, wherein the signal analyzer is configured to generate service instructions based on the self-diagnostic.

10. A method, comprising:
    selecting a signal comprising a plurality of indicators of a fault in a reactive system;
    extracting the plurality of indicators from the signal, by:
        determining a plurality of orthogonal projections of the signal, each orthogonal projection corresponding to a signal family included in the signal;
        iteratively processing the orthogonal projections in descending signal strength order, where in each of a plurality of iterations a component of the signal corresponding to the signal family of the orthogonal projection being processed is removed before proceeding to any next iteration; and
    analyzing the plurality of indicators to facilitate diagnostics of the reactive system.

11. The method of claim 10, wherein the extracting further comprises decomposing the signal to extract the plurality of indicators from the signal.

12. The method of claim 10, wherein the extracting further comprises:
    assuming that the plurality of indicators add linearly within the signal; and
    additively decomposing the signal into the plurality of indicators.

13. The method of claim 10, further comprising producing root-cause oriented diagnostics of the reactive system based on the analyzing the plurality of indicators.

14. The method of claim 10, wherein the analyzing further comprises accessing a database of potential faults related to the reactive system and diagnosing a fault of the reactive system by comparing the plurality of indicators to information stored in the database of faults.

15. The system of claim 1, wherein the system is to decompose the signal by further determining for the signal an order of the orthogonal projections in correspondence with likely signal strengths of the corresponding signal families.

16. The system of claim 1, wherein the system is to decompose the signal by further receiving a predetermined order of the orthogonal projections in correspondence with likely signal strengths of the corresponding signal families.

* * * * *

UNITED STATES PATENT AND TRADEMARK OFFICE
CERTIFICATE OF CORRECTION

| | | |
|---|---|---|
| PATENT NO. | : 9,063,884 B2 | Page 1 of 1 |
| APPLICATION NO. | : 13/658078 | |
| DATED | : June 23, 2015 | |
| INVENTOR(S) | : Ayelet Pnueli et al. | |

It is certified that error appears in the above-identified patent and that said Letters Patent is hereby corrected as shown below:

In The Drawings:

In sheet 8 of 12, line 15, delete "temoving" and insert -- removing --, therefor.

Signed and Sealed this
Twenty-second Day of December, 2015

Michelle K. Lee
*Director of the United States Patent and Trademark Office*